Figures 1, 2, 3:
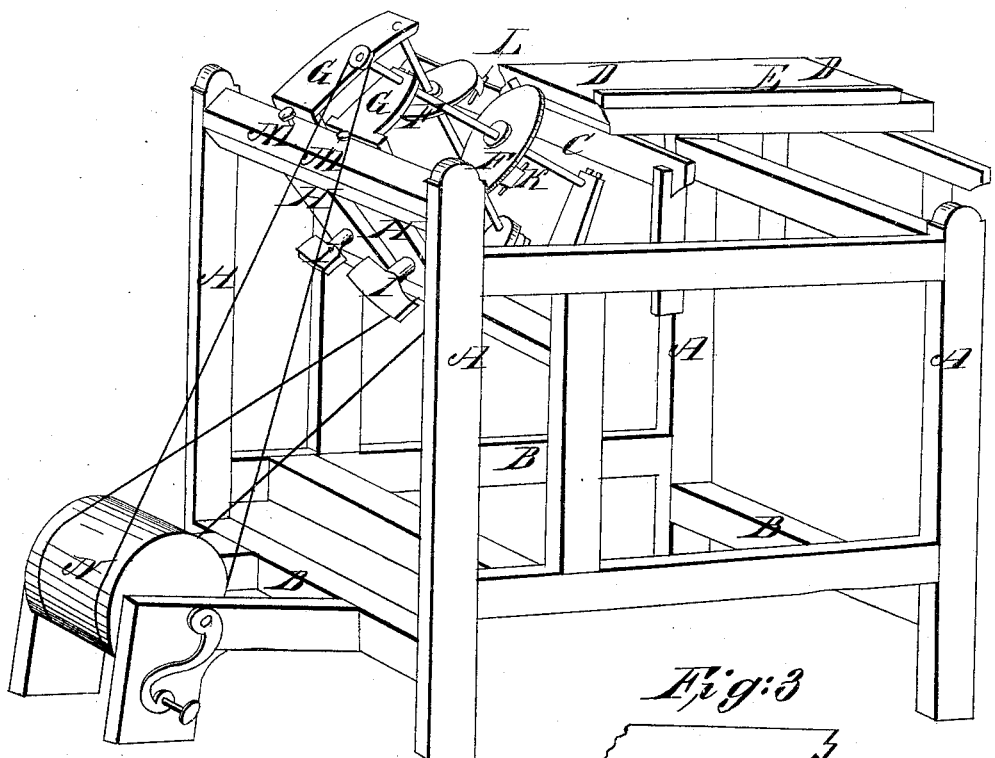

R. Urann,
Dovetailing Machine,
Nº 1,380.   Patented Oct. 26, 1839.

UNITED STATES PATENT OFFICE.

RICHARD URANN, OF BOSTON, MASSACHUSETTS.

MACHINE FOR MITERING AND DOVETAILING BOARDS AND PLANK FOR THE FORMATION OF BOXES AND FOR OTHER PURPOSES.

Specification of Letters Patent No. 1,380, dated October 26, 1839.

*To all whom it may concern:*

Be it known that I, RICHARD URANN, of the city of Boston, in the State of Massachusetts, have invented an improvement in the manner of constructing machines for mitering and dovetailing boards and plank for the formation of boxes and for other purposes.

My machine is similar, in its general construction, to that for which Ari Davis obtained Letters Patent of the United States, having in view the same general object; but I have made improvements in its operating parts, by which it is simplified, and its action rendered more perfect; and I do hereby declare that the following is a full and exact description thereof.

In Figure 1, in the accompanying drawing, the frame of this machine is represented as formed of wood; A, A, being the four corner posts, and B, B, girths by which they are connected together.

C, C, are iron ways supported by the frame, and upon which ways the platform, or carriage, D, D, is to slide; said carriage having, on its under side, suitable notches, or guide pieces, adapting it to run on the ways. Upon this carriage, or platform, the stuff to be mitered and dovetailed is to be placed, its back end resting against a movable gage-piece E, to adapt it to boards of different lengths. The disks F, F', which carry the cutters, are fixed upon spindles that run in the puppet heads G, G. These puppet heads rest upon flat bed pieces H, H, framed into the girths so as to stand at an angle of forty-five degrees with the horizon, or with the plane of the carriage D, D. The puppet heads are made capable of sliding, endwise, upon the bed pieces H, H, for the purpose of adapting the cutters to the work they are to perform; the tightening screws I, I, are to confine the puppet heads in place when duly set. The disk F', carries two cutters, J, and K. The cutter J, is of sufficient width to cut the miter on the end of the board, and is so placed as to effect this object. The cutter K, is of such width and form as, at the same time, to cut the upper side of the dovetailed groove, Fig. 2, or the lower side of the dovetailed tongue, Fig. 3, as the case may be. The cutter L, upon the disk F, in like manner, as the stuff is brought up against it, cuts the opposite portion of the dovetailed groove, or of the dovetailed tongue, as may be required; it being made in such form, and placed at such an angle, as to perform this office.

To check the puppets G, G, when shifted endwise, so that they may be at once secured in the proper position, I employ check screws M, M, to serve as stops to them, and which may be screwed in, or not, to adapt the machine to stuff of various thicknesses.

N, is a drum to be turned by a winch, or otherwise, for giving motion to the spindles by bands passing around whirls upon them.

Having thus, fully described the manner in which I construct my machine for mitering and dovetailing boards and plank, I hereby declare that my improvements consist in entirely dispensing with the use of saws, and in effecting the whole object by means of cutters, in the manner set forth.

I therefore claim as my improvement—

The employment, on the same disk, of the cutters J, and K; one of them for cutting the miter on the end of the board, and the other for cutting one half of the dovetailed tongue, or dovetailed groove, in combination with cutter L, on the second disk, for completing the said dovetailed tongue, or groove, the whole operating substantially as herein described.

RICHARD URANN.

Witnesses:
 CHARLES P. CURTIS,
 GEORGE C. HERBERT.